No. 684,563. Patented Oct. 15, 1901.
W. BERGSJO.
EYEGLASSES.
(Application filed Oct. 22, 1900.)

(No Model.)

Witnesses:
G. H. Glendenning
B. C. Sims

Inventor:
Martin Bergsjo
By W. Hopkins Attorney

United States Patent Office.

MARTIN BERGSJO, OF CHICAGO, ILLINOIS, ASSIGNOR OF ONE-HALF TO HENRY BORSCH, OF SAME PLACE.

EYEGLASSES.

SPECIFICATION forming part of Letters Patent No. 684,563, dated October 15, 1901.

Application filed October 22, 1900. Serial No. 33,873. (No model.)

*To all whom it may concern:*

Be it known that I, MARTIN BERGSJO, a citizen of the United States, residing at Chicago, in the county of Cook and State of Illinois, have invented certain new and useful Improvements in Eyeglasses, of which the following is a specification.

The present invention relates to means for securing the ends of the spring and of the guard-stems in place in the boxes; and its object is to provide improved means for this purpose with a view to making the glasses more sightly at this point and preventing the parts from working loose.

The invention consists in the features of novelty that are hereinafter described; and in order that it may be fully understood I will describe it with reference to the accompanying drawings, which are made a part hereof, and in which—

Figure 1:
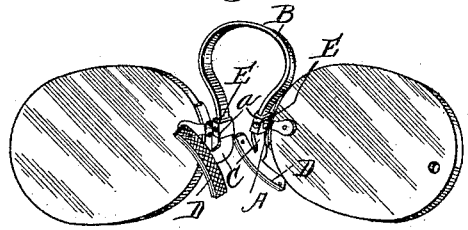
Figure 2:
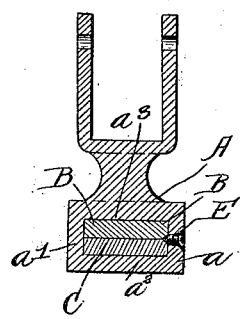
Figures 3, 4:
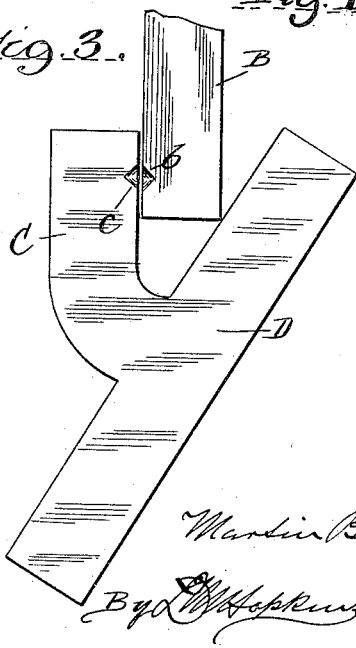

Figure 1 is a perspective view of a pair of eyeglasses embodying the invention. Fig. 2 is an enlarged section of the box, taken in the axial plane of the screw and post. Fig. 3 is an enlarged view of the guard. Fig. 4 is an enlarged view of one end of the spring.

A represents the box, which has through it from top to bottom a rectangular opening for the reception of the end of the spring B and the end of the stem C of the guard D. These last-named parts overlap in customary manner and are provided in their edges with notches or indentations $b$ and $c$, respectively, which fall opposite each other when the parts are in place. Through the rear wall $a$ of the box is a threaded opening adapted to receive a screw E, having a tapering point $e$, which is adapted to engage the inner edges of the parts B and C, entering the notches $b\ c$, the head of the screw being preferably countersunk. With this arrangement the screw forces the parts B and C toward the opposite wall $a'$ of the box, and also tends to separate them and force them against the walls $a^2$ and $a^3$. This gives them frictional contact with three walls of the box and tends to prevent their withdrawal, this tendency being augmented by the presence of the end of the screw in the notches $b\ c$. This effectually prevents the withdrawal of the parts B and C while the screw is in place, and by reason of the jamming or wedging of the end of the screw between the parts B and C the screw is effectually locked and prevented from backing out in the ordinary use of the glasses. An advantage in locating the screw at the rear side of the box is that it is entirely concealed while the glasses are in use, and its head does not rust as a result of contact with or proximity to the nose.

Having described my invention, what I claim as new therein, and desire to secure by Letters Patent, is—

1. In an eyeglass, the combination of a box having through it a rectangular opening, a spring and guard-stem, the ends of which occupy said opening and overlap, the box being provided with a threaded opening in the plane of the meeting faces of the spring and guard-stem, and a screw occupying said threaded opening and having a tapering point adapted to engage the near edges of the spring and guard-stem, whereby they are forced against the far side of the box and at the same time spread apart by the tapering point of the screw, substantially as set forth.

2. In an eyeglass, the combination of a box having through it a rectangular opening, a spring and guard-stem, the ends of which occupy said opening and overlap, the box being provided with a threaded opening in the plane of the meeting faces of the spring and guard-stem, and a screw occupying said threaded opening and having a tapering point adapted to engage the near edges of the spring and guard-stem, the edges of said spring and guard-stem having shallow notches into which the tapering end of the screw enters a short distance, whereby the spring and guard-stem are forced against the side of the box remote from the screw and at the same time spread apart, substantially as set forth.

MARTIN BERGSJO.

Witnesses:
HENRY BORSCH,
L. M. HOPKINS.